United States Patent [19]

Fetchin et al.

[11] 3,944,609
[45] Mar. 16, 1976

[54] CATALYST PREPARATION METHOD
[75] Inventors: John Allan Fetchin; William Frank Marzluff, both of Stamford, Conn.
[73] Assignee: American Cyanamid Company, Stamford, Conn.
[22] Filed: Apr. 17, 1975
[21] Appl. No.: 569,327

Related U.S. Application Data
[63] Continuation of Ser. No. 366,223, June 1, 1973, abandoned.

[52] U.S. Cl............................................ 260/561 N
[51] Int. Cl.².................................... C07C 103/08
[58] Field of Search................................ 260/561 N

[56] References Cited
UNITED STATES PATENTS 3,696,152 10/1972 Habermann et al............ 260/561 N
3,758,578 9/1973 Habermann et al............ 260/561 N
3,767,706 10/1973 Habermann et al............ 260/561 N

*Primary Examiner*—C. Davis
*Attorney, Agent, or Firm*—Gordon L. Hart

[57] ABSTRACT

Homogeneous catalyst for hydration of nitriles to produce amides comprises reduced copper with at least 0.2 percent by weight of reduced iron. Preferred catalysts prepared by reduction of copper and iron compounds with borohydride reducing agent have improved stability of catalytic activity during storage as compared with copper catalysts made without iron.

4 Claims, 1 Drawing Figure

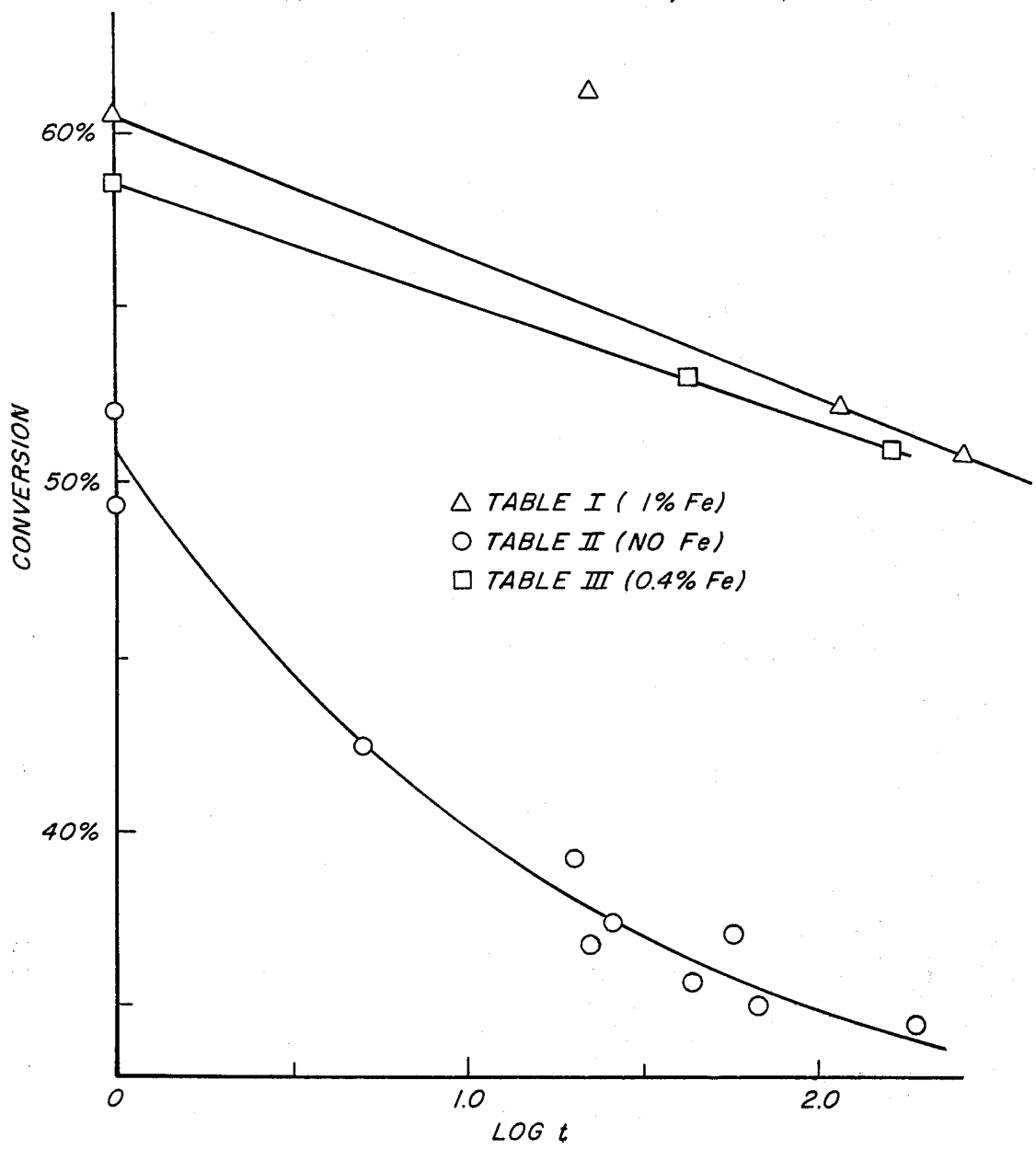

CATALYST PREPARATION METHOD

This is a continuation, of application Ser. No. 366,223, filed June 1, 1973, now abandoned.

The invention relates to improvements in solid catalysts for hydration of nitriles with water to produce amides. More particularly the invention relates to improvement of solid copper catalyst and the use of such improved catalyst as a heterogeneous catalyst for hydration of the cyano radical of a selected nitrile to convert such nitrile to the corresponding amide.

Solid heterogeneous catalysts have been described for use in processes for catalytic hydration of the cyano group in any of a variety of nitriles, $R-CN$, to produce the corresponding amide derivatives, $R-CONH_2$, wherein R represents an organic radical such as aliphatic, cycloaliphatic, aromatic hydrocarbon and the like. Reference is made to the following United States patents which describe a variety of nitrile compounds that can be hydrated to produce corresponding amides by reaction of nitrile and water in contact with heterogeneous solid catalysts: U.S. Pat. Nos. 3,381,034, patented Apr. 30, 1968, 3,366,639, patented Jan. 30, 1968, 3,679,745, patented July 25, 1972, 3,674,848, patented July 4, 1972 and 3,631,104, patented Dec. 28, 1971. Examples of heterogeneous catalysts previously described for hydration of nitriles include manganese dioxide, copper chromium oxide, cupric chloride, copper sulfate, nickel in various forms, oxides of iron, cobalt, zinc, aluminum and the like. One promising catalyst for nitrile hydration is copper in solid state, preferably in a form having a high ratio of surface area to weight, and preferably in freshly reduced state, e.g. newly prepared by reduction of a copper compound to elemental copper. Copper catalysts prepared by reduction of reducible solid copper compounds such as copper oxide, copper chromium oxide and the like with hydrogen, have been described for use in hydration of nitriles.

Several forms of copper prepared by the reduction of copper compounds and precipitation of copper from solution have been described for use as solid catalysts for the hydration of nitriles. A preferred method for preparing such a catalyst is the precipitation of copper by the reduction of cuprous or cupric salt in aqueous solution using a water-soluble borohydride reducing agent. For example the reaction of sodium borohydride and copper sulfate in aqueous solution produces a flocculent precipitate of extremely finely divided copper solids having relatively high surface area per unit weight and having excellent catalytic activity for nitrile hydration. The reduced catalyst may be used with a catalyst support such as alumina or carbon or it may be used in a catalyst bed, mixed with inert fillers such as alumina, carbon or the like.

It has now been discovered that the presence of a minor quantity of iron in addition to the copper in the catalyst solids composition will improve initial catalytic activity of the catalyst for the catalytic hydration of nitriles to produce amides. In addition to such improved initial catalytic activity, the copper catalyst which contains a minor quantity of iron is furthermore found to have improved stability of catalytic activity when it is necessary or desirable to store the reduced copper catalyst for a period of time before it is used. That is, the presence of iron in reduced state in small proportions is found to inhibit the decay of catalytic activity while the reduced copper catalyst is in storage before use.

The minimum amount of iron needed for any significant improvement of catalytic activity is about 0.2% by weight of elemental iron based on combined dry copper and iron content of the catalyst. Catalysts embodying the invention may contain up to about 5 percent or even more percent by weight or iron, same basis. The optimum iron content for best catalyst performance appears to be about 1% by weight, same basis.

One convenient way of incorporating such minor amounts of iron in the copper catalyst is to mix a reducible iron compound with a reducible copper compound that is about to be reduced and then reducing the mixture of iron and copper compounds by whatever means is selected. When reducing solid oxides of copper with hydrogen at high temperature, e.g. 400°–700°C. to produce elemental copper catalyst, one may intimately mix in a reducible iron oxide in a selected small amount with the copper oxide and proceed to reduce the mixture with hydrogen under conditions suitable for reduction of the copper and iron in the mixture.

We prefer to prepare the catalyst by reduction of copper compounds in aqueous solution and so we select a reducible, water-soluble iron compound, preferably ferrous chloride, which is dissolved in the same solution with the dissolved copper compound before the reducing step. Addition of a water-soluble reducing agent, preferably sodium borohydride, to the solution precipitates the iron and copper together, preferably in flocculent aggregates of fine particulate copper with the small amount of reduced iron included.

The solid catalyst may be contacted with a mixture of the reactants, nitrile and water, which may be present in any desired proportions, preferably as a homogeneous solution with both reactants dissolved therein or one reactant dissolved in the other. A solution of one reactant in the other, e.g. nitrile in water, may be used when the selected nitrile and water are mutually soluble. Otherwise an inert mutual solvent for both reactants can be used for the hydration reaction medium, or a cosolvent can be used to promote solubility of one reactant in the other.

The invention will be described in detail in the following examples, using acrylonitrile in aqueous solution as the reactant feed solution and using copper with iron reduced from aqueous solution by sodium borohydride, to illustrate the most preferred mode that we have used for carrying out the invention.

EXAMPLE 1

Catalyst Preparation

To an aqueous solution of 39.3 gm. $CuSO_4 \cdot 5H_2O$ (Baker reagent grade) and 28.3 gm. dextrose in 250 ml. water was added 10.0 ml. of 0.157 molar solution of $FeCl_2$. One liter of 0.47 molar NaOH was added slowly with rapid stirring, followed by addition of 100 ml., 0.1 normal NaOH containing 3.0 gm. $NaBH_4$. The mixture was stirred vigorously for 15 minutes under argon atmosphere then the precipitate was filtered and washed with three liters of degassed water. One gram aliquots of the catalyst were stored in water which had been purged with argon to remove oxygen. A one gram portion was used after one hour storage and the others were stored for varying longer periods before their use as catalysts in repetitions of the hydration reaction described below. Iron to copper ratio in the catalyst solids was about 1:100.

Hydration Reaction

A one gram sample of the catalyst after storage for one hour was placed in a test tube with 10 gm. water and 0.6 gm. acrylonitrile. The tube was stoppered and the mixture was agitated for one half hour with temperature maintained at 57°C. Then the mixture was cooled in an ice bath, centrifuged and the supernatant solution was separated. Acrylonitrile and acrylamide concentrations were determined by gas chromatography. The reaction was repeated with other samples after storage of each sample for 23, 120 and 264 hours respectively. Conversions of acrylonitrile to acrylamide as determined by analysis following each reaction, are tabulated in Table I.

TABLE I

| Catalyst Storage Time (hrs.) | Conversion (% Nitrile to Acrylamide) |
|---|---|
| 1 | 60.5 |
| 23 | 61.2 |
| 120 | 52.0 |
| 264 | 50.6 |

EXAMPLE 2

For comparison to demonstrate the advantage of the presence of iron in the catalyst, the procedure described in Example 1 was repeated except without the addition of any $FeCl_2$ in the catalyst preparation. Conversions obtained in two series of tests are tabulated in Table II.

TABLE II

| Catalyst Storage Time (hrs.) | Conversion (% Nitrile to Acrylamide) |
|---|---|
| 1 | 52.0 |
| 5 | 42.5 |
| 22.5 | 36.8 |
| 46.5 | 37.0 |
| 1 | 49.5 |
| 20 | 39.2 |
| 26 | 37.2 |
| 45 | 35.7 |
| 69 | 35.0 |
| 194 | 34.5 |

Analysis of the reagent grade copper sulfate used in Examples 1 and 2 revealed about 80 ppm iron, which would produce about 300 ppm (0.03% by wt.) iron in the catalyst product. A less highly refined copper sulfate available commercially was used in Example 3.

EXAMPLE 3

The same procedure described in Example 2 was followed except instead of the reagent grade copper sulfate, there was used a less highly refined $CuSO_4 \cdot 5H_2O$ which contained about 1000 ppm iron and which produced about 0.4% by wt. iron in the reduced catalyst product. Conversions obtained with the catalyst samples are tabulated in Table III.

TABLE III

| Catalyst Storage Time (hrs.) | Conversion (% Nitrile to Acrylamide) |
|---|---|
| 1 | 58.5 |
| 44 | 53.1 |

TABLE III-continued

| Catalyst Storage Time (hrs.) | Conversion (% Nitrile to Acrylamide) |
|---|---|
| 164 | 51.0 |

Data in TAbles I – III is plotted in the drawing, which is a semilog graph of log catalyst storage time versus percent conversion. The two runs in Table 2 were plotted together. Points for the reactions using identical catalysts are indicated by identifying marks.

EXAMPLE 4

Catalyst samples were prepared and stored as described in Example 1 except the amounts of ferrous chloride were varied to produce samples containing from about 0.1% iron up to about 4% by wt. iron. These samples were tested in the hydration reaction described in Example 1. Conversion obtained with several of those respective samples are tabulated in Table IV and the iron content of each catalyst sample is also tabulated.

| Iron Content % by wt. in Catalyst | Catalyst Storage Time (hrs.) | Conversion (% Nitrile to Acrylamide) |
|---|---|---|
| .11 | 2 | 48.1 |
|  | 24 | 41.6 |
|  | 120 | 32.5 |
| .22 | 2 | 58.2 |
|  | 19 | 51.0 |
| .44 | 0.5 | 67.0 |
|  | 18 | 69.0 |
|  | 42 | 52.0 |
| .66 | 0.5 | 73.0 |
|  | 18 | 56.6 |
| 1.75 | 0.5 | 65.0 |
|  | 19 | 55.5 |
|  | 43 | 55.5 |
| 3.50 | 3.5 | 54.5 |
|  | 22 | 52.5 |
|  | 46 | 57.5 |

By the results of tests conducted as described in the foregoing examples it is demonstrated that reduced copper catalyst, when used for catalytic hydration of nitriles, will have improved catalytic activity and improved retention of catalytic activity in storage if the copper catalyst contains a small amount of reduced iron in the range from about 0.2 to about 4.0% by weight based upon weight of the copper and iron in the catalyst.

We claim:

1. A process comprising catalytic conversion of acrylonitrile to acrylamide by hydration of the nitrile with water in contact with solid heterogeneous catalyst prepared by reduction of copper and iron from aqueous solution of soluble copper and iron compounds wherein the active catalyst components of said catalyst consist essentially of reduced copper and reduced iron with about 0.2 to about 4 percent by weight of the combined dry weight of the reduced copper and iron being reduced iron.

2. A process defined by claim 1 wherein the defined catalyst consists essentially of copper and iron solids reduced and precipitated from aqueous solution by reaction of a soluble borohydride with dissolved copper and iron compounds in said solution.

3. A process defined by claim 1 wherein the amount of reduced iron present in the defined catalyst is about 1% by weight on the defined basis.

4. A process defined by claim 2 wherein the defined catalyst consists essentially of copper and iron solids reduced and precipitated from aqueous solution by reaction of sodium borohydride with dissolved copper sulfate and ferrous chloride in said solution.

* * * * *